(12) United States Patent
Seibert et al.

(10) Patent No.: US 10,803,089 B1
(45) Date of Patent: Oct. 13, 2020

(54) GRID BASED PATHFINDING

(71) Applicant: Amazon Technologies, Inc., Seattle, WA (US)

(72) Inventors: Lucas Darryl Seibert, Los Angeles, CA (US); Rajeev Varma Penmatsa, Lake Forest, CA (US)

(73) Assignee: Amazon Technologies, Inc., Seattle, WA (US)

( * ) Notice: Subject to any disclaimer, the term of this patent is extended or adjusted under 35 U.S.C. 154(b) by 354 days.

(21) Appl. No.: 14/627,789

(22) Filed: Feb. 20, 2015

(51) Int. Cl.
*G06F 16/00* (2019.01)
*G06F 16/28* (2019.01)

(52) U.S. Cl.
CPC .................. *G06F 16/284* (2019.01)

(58) Field of Classification Search
CPC combination set(s) only.
See application file for complete search history.

(56) References Cited

U.S. PATENT DOCUMENTS

| | | | | |
|---|---|---|---|---|
| 7,197,573 B1* | 3/2007 | Jacobson | ............ | H04L 43/0882 370/237 |
| 7,430,257 B1* | 9/2008 | Shattil | ................... | H04B 1/707 342/367 |
| 7,496,650 B1* | 2/2009 | Previdi | ................ | H04L 45/028 370/229 |
| 7,720,076 B2* | 5/2010 | Dobbins | ............. | H04L 12/1886 370/395.52 |
| 8,392,473 B2 | 3/2013 | Thomson et al. | | |
| 9,171,396 B2* | 10/2015 | Jenkins | ................... | G06T 15/40 |
| 9,489,762 B2* | 11/2016 | Jenkins | ................ | G06T 19/003 |
| 2006/0294238 A1 | 12/2006 | Naik et al. | | |
| 2007/0112803 A1* | 5/2007 | Pettovello | ............ | G06F 16/134 |
| 2007/0206008 A1 | 9/2007 | Kaufman et al. | | |
| 2008/0101259 A1* | 5/2008 | Bryant | ................... | H04L 45/00 370/254 |
| 2008/0144529 A1* | 6/2008 | McKee | ................... | H04L 29/06 370/254 |
| 2009/0275414 A1 | 11/2009 | Lee et al. | | |
| 2010/0122236 A1 | 5/2010 | Bugir et al. | | |
| 2011/0113155 A1 | 5/2011 | Kuznetsov et al. | | |
| 2012/0229445 A1* | 9/2012 | Jenkins | ................ | G06T 15/405 345/418 |
| 2013/0339545 A1* | 12/2013 | Shenoi | ................... | H04L 47/24 709/240 |

(Continued)

OTHER PUBLICATIONS

Adobbati, Rogelio, Andrew N. Marshall, Andrew Scholer, Sheila Tejada, Gal A. Kaminka, Steven Schaffer, and Chris Sollitto. "Gamebots: A 3d virtual world test-bed for multi-agent research." In Proceedings of the second international workshop on Infrastructure for Agents, MAS, and Scalable MAS, vol. 5. Montreal, Canada, 2001.*

(Continued)

*Primary Examiner* — Farhan M Syed
(74) *Attorney, Agent, or Firm* — Lee & Hayes, P.C.

(57) ABSTRACT

Technologies are disclosed herein for providing a pathfinding service for distributed processing of path data for a grid. The pathfinding service is configured to initiate computing instances to process the path data, and to determine if an acceptable path exists through the grid. Upon determination of the acceptable path, the pathfinding service may terminate any remaining computing instances.

20 Claims, 11 Drawing Sheets

(56) References Cited

U.S. PATENT DOCUMENTS

| | | | |
|---|---|---|---|
| 2014/0006342 A1 | 1/2014 | Love et al. | |
| 2014/0200036 A1* | 7/2014 | Egner | H04W 64/00 455/456.3 |
| 2014/0270480 A1* | 9/2014 | Boardman | G06T 11/206 382/154 |
| 2014/0279662 A1 | 9/2014 | Wang et al. | |
| 2014/0289206 A1 | 9/2014 | Zhang et al. | |
| 2015/0370445 A1* | 12/2015 | Wang | G06F 16/986 715/765 |
| 2016/0134373 A1* | 5/2016 | Gros | H04B 10/1129 398/156 |
| 2016/0174106 A1* | 6/2016 | Lee | H04W 40/20 705/14.63 |
| 2016/0217371 A1* | 7/2016 | Leithiser | G06F 16/28 |

OTHER PUBLICATIONS

Blewitt, William, Gary Ushaw, and Graham Morgan. "Applicability of gpgpu computing to real-time ai solutions in games." IEEE Transactions on Computational Intelligence and AI in Games 5, No. 3 (2013): 265-275.*

"A* search algorithm," Wikipedia, available at: http://en.wikipedia.org/wiki/A*_search_algorithm, downloaded Feb. 11, 2015, 11 pages.

Horn et al., "Interactive k-D tree GPU raytracing", In Proceedings of the 2007 Symposium on Interactive 3D Graphics and Games, ACM, May 17, 2007, pp. 167-174. 8 pages.

Office action for U.S. Appl. No. 14/627,903, dated Feb. 16, 2016, Seibert et al., "Hierarchical Processing and Caching of Path Solutions", 10 pages.

Adobbati, et al, "Gamebots: A 3D Virtual World Test-Bed For Multi-Agent Research", Proceedings of the second international workshop on Infrastructurefor Agents, MAS and Scalable MAS, vol. 5, Montreal, Canada, 2001, 6 pages.

Blewitt, et al., "Applicability of GPGPU Computing to Real-Time AI Solutions in Games", IEEE Transactions on Computational Intelligence and AI in Games, vol. 5, No. 3, Sep. 2013, pp. 265-275.

Darken, "Visibility and Concealment Algorithms for 3D Simulations", Naval Postgraduate School, 2004, 11 pages.

Granatir, Orion "Two Brains Are Better Than One", Intel Software Development Zone, Jan. 12, 2014, Web. Aug. 7, 2017, «https://software.intel.com/en-us/articles/two-brains-are-better-than-one», Internet Archive, «https://web.archive.org/web/20140112154937», «http://software.intel.com:80/en-us/articles/two-brains-are-better-than-one».

Office action for U.S. Appl. No. 14/627,793, dated Aug. 10, 2017,, Seibert et al., "Determining Visibility in Virtual Environments", 36 pages.

Pursel, "Synthetic vision visual perception for computer generated forces using the programmable graphics pipeline", Calhoun Institutional Archive to the Naval Postgraduate School, Dissertation, Sep. 2004, 116 pages.

Buro, et. al., "RTS games and real-time AI research.", Proceedings of the Behavior Representation in Modeling and Simulation Conference (BRIMS). vol. 6370. 2004.

Eisert, et. al., "Remote Rendering of Computer Games." SIGMAP. 2007.

Office action for U.S. Appl. No. 14/627,793, dated Jan. 11, 2018, Seibert et al., "Determining Visibility in Virtual Environments", 42 pages.

Office Action for U.S. Appl. No. 14/627,793, dated Jul. 13, 2018, Seibert, et al., "Determining Visibility in Virtual Environments", 47 pages.

Office Action for U.S. Appl. No. 14/627,793, dated Dec. 21, 2018, Seibert, "Determining Visibility in Virtual Environments," 43 pages.

* cited by examiner

| START 202 | G 218 | H 220 | OBS 226 | PLAYER 230 |
|---|---|---|---|---|
| A 204 | E 214 | I 222 | | OBS 226 |
| B 206 | OBS 226 | F 216 | J 224 | OBS 226 |
| C 210 | D 212 | | GOAL 232 | OBS 226 |

FIG. 2A

GRID BASED PATHFINDING

BACKGROUND

Many graphical applications, such as video games, three-dimensional (3D) object and video rendering applications, route-planning applications, and other similar graphical applications, include complex underlying problems for appropriately determining solutions to geometry-based issues. Geometry-based issues can include visualization issues with regard to how a portion of an object is visualized in light of obstacles or other artifacts in a virtual space. Geometry-based issues can also include implementation of traditional algorithms to solve mapping or path-cost analysis.

Conventionally, algorithms such as the A* search algorithm, and other similar algorithms, may be implemented to at least partially solve some geometry-based issues related to path-cost or in an attempt to provide optimal route-planning. For example, when considering a graphical application such as a video game, the A* search algorithm may be implemented to consider the navigation of one or more elements within the video game. Such elements can include graphical representations of enemies, vehicles, virtual objects, and other elements. When considering the navigation of such elements within the virtual space, the implementation of the A* search algorithm may proceed to greedily consider a large number of possible paths for each element.

It follows that as the number of elements being navigated increases, the computational complexity of the A* search algorithm can increase dramatically. Accordingly, conventional systems may attempt to limit a total number of elements with the ability to actively navigate within the virtual space. These limitations may decrease enjoyment of the video game, or in other applications, may provide limited utility in use of a route-planning application. Furthermore, if the implementation of the A* search algorithm does not limit the total number of elements, dramatic increases in processing times may result. Thus, efficiency in displaying the virtual environment may be decreased. Additionally, immersive rendering of such a virtual space may be affected, thereby further limiting enjoyment of the video game or graphical application.

The disclosure made herein is presented with respect to these and other considerations.

BRIEF DESCRIPTION OF THE DRAWINGS

FIG. 2A is a map diagram illustrating aspects of a virtual space for processing by a pathfinding service in one configuration described herein;

DETAILED DESCRIPTION

Figure 1:
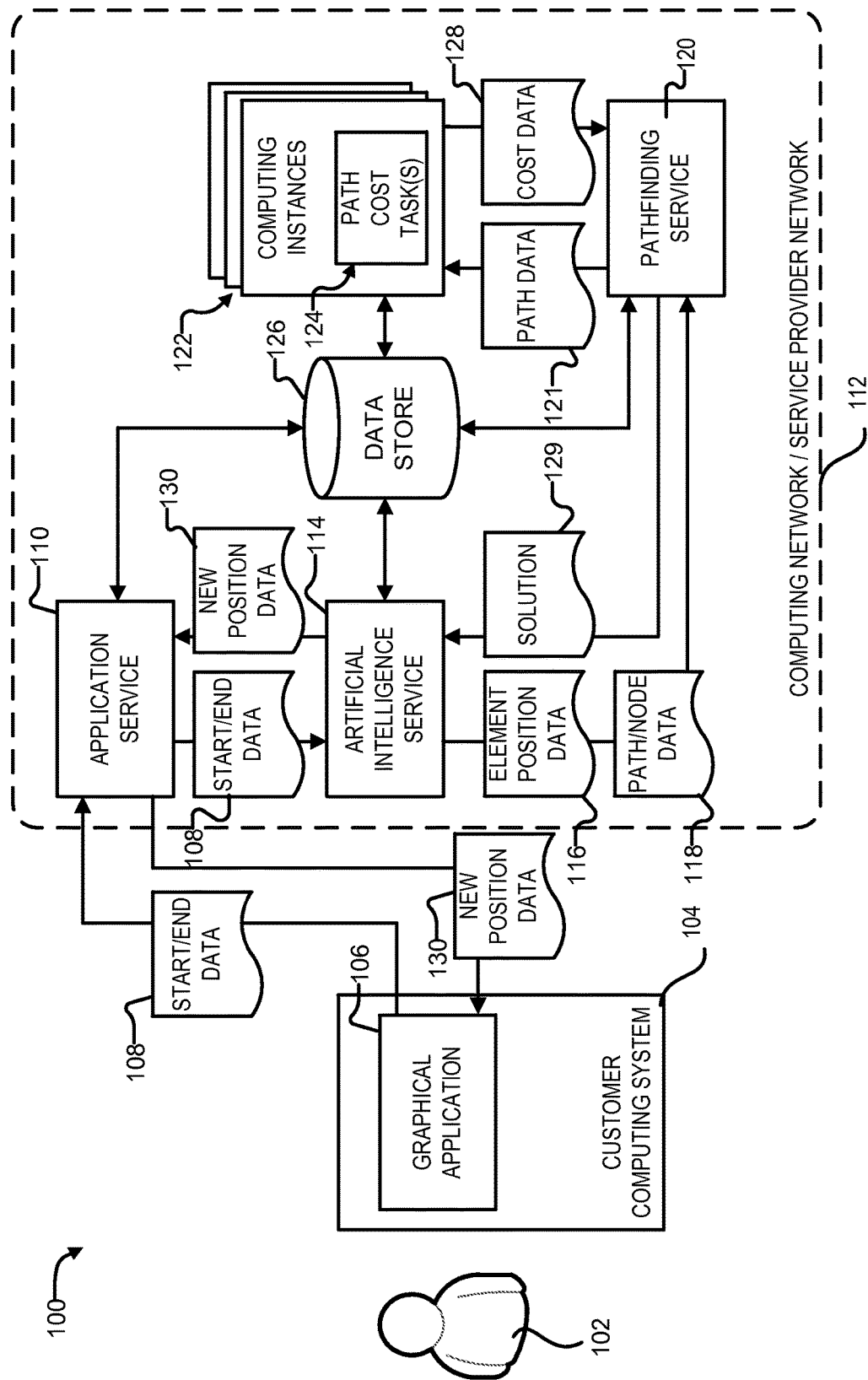
FIG. 1 is a system architecture diagram showing aspects of the configuration and operation of a pathfinding service in one configuration presented herein.

The following detailed description is directed to technologies for providing a pathfinding service. Utilizing the technologies described herein, a pathfinding service can be implemented that provides functionality for finding acceptable solutions to geometry-based problems. The geometry-based problems are based on a map, or grid, representative of a virtual space. The grid may include a geography-based grid representative of the virtual space. The grid may be processed to determine appropriate path and node data along with costs associated with traversing the associated nodes or edges of the path and node data.

Generally, the path and node data include at least an indication of a desired start position and an end position provided by a graphical application, such as a video game. Upon receipt of the start position and end position, the pathfinding service may initialize one or more computing instances to process the path and node data. For example, upon being presented a node with more than one possible path, the pathfinding service initializes a new computing instance to process each possible path.

The initialized computing instances may include path or cost calculation tasks configured to calculate whether the end node can be reached and an associated cost with traversing the path to reach the end position. If intervening nodes exist along the path being processed, and the intervening nodes include an additional path, the pathfinding service may initialize an additional computing instance to consider the additional paths. In this manner, the pathfinding service may direct many computing instances to consider many possible paths substantially in parallel.

If a particular computing instance determines that the end position can be reached, and the associated cost in traversing to the end position is within an acceptable threshold, the remaining computing instances may be terminated and the processed path is returned as an acceptable solution to the geometry-based problem.

The pathfinding service may also distribute path and cost information in other forms. For example, the pathfinding service may deconstruct the path and node data into one or more equations, such as linear equations, representative of possible path solutions to the geometry-based problem. The equations may be created through hashing the grid information described above to extract appropriate constants and costs. The constants and costs are arranged into an equation that represent a single path. If more than one possible path exists, additional equations are constructed from the constants and costs such that each equation represents one possible path.

Upon creation of the equations, the pathfinding service may initialize a new computing instance to solve an individual equation. Thereafter, each computing instance may solve the associated equation and return the solution as a total cost for traversing an associated path to reach the end node. If any returned solution, during the substantially parallel processing of each computing instance, is within an acceptable threshold value, the remaining computing instances may be terminated and the processed path is returned as an acceptable solution to the geometry-based problem.

The pathfinding service may also calculate path and cost information in other manners. For example, the pathfinding service can determine that a particular sub-portion of a virtual space includes a start position, an end position, and multiple paths therebetween. The pathfinding service may represent the particular sub-portion as a single node, or hierarchical representation, having a cost of traversal set as an appropriate path cost for traversing an acceptable one of the multiple paths. This cost may be cached in a centralized data store or replicated data store to allow access by many different computing instances. Furthermore, as underlying cost values for any of the multiple paths represented by the hierarchical representation change, the cached path cost may be re-calculated by any of the processes described herein.

The pathfinding service may cache many different hierarchical representations of sub-portions at varying levels of granularity of the represented virtual space. At any particular level of granularity, nodes existing in one hierarchical representation cannot exist in a different hierarchical representation simultaneously. However, in a higher level of granularity, multiple single hierarchical representations may be grouped into a higher-order hierarchical representation. In this manner, only some of the underlying hierarchical representations need to be calculated when underlying node or cost values change. Thus, instead of recalculating path cost data for all nodes in a virtual space, only one or more sub-spaces within hierarchical representations need to be recalculated based on the dynamic changes in a virtual space. Thus, many other path cost calculations can be avoided and cached values can be used relatively quickly by any computing instance, service, or application requesting a path calculation.

In general, the computing instances briefly described above can be deployed through a service provider network that also manages the execution of the pathfinding service, and any additional services, that operate to provide information to the graphical application. For example, upon determination of an acceptable solution to the geometry-based problem, additional services may process the associated acceptable solution to provide a route for a graphical element to traverse within the virtual space. In this manner, an element can appear to have artificial intelligence in that acceptable paths are traversed without considering other optimal paths that require additional latency for computation in positioning of the element. Accordingly, many elements can be considered simultaneously through distributed computing provided through the pathfinding service by reducing processing time associated with always identifying an optimal path solution to geometry-based problems. Additional details regarding the various components and processes described above for implementing a pathfinding service will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of a pathfinding service 120 in one configuration presented herein. As shown in FIG. 1, a customer 102 may operate a customer computing system 104. The customer computing system 104 may include any suitable computing system. For example, the customer computing system 104 can include a portable computer, mobile device, tablet computer, or similar computing devices. According to one implementation, the customer computing system 104 is a mobile computing device having somewhat limited processing capabilities.

The customer computing system 104 is configured to execute a graphical application 106. The graphical application 106 may include a route-planning application such as a mapping application. The graphical application 106 may also include a video game. The graphical application can also include other applications that consider one or more geometry-based problems.

The graphical application 106 may determine start/end data 108 for at least one graphical problem, according to some implementations. The start/end data 108 can include initial or start node data for an element in a virtual space, in one implementation. The start/end data 108 can also include goal or end node data for the element in the virtual space. The start node data may include an initial position for the element within the virtual space, while the end node data may include a desired goal position for the element within the virtual space. Representations of start/end node data and the virtual space are described more fully with reference to FIG. 2.

The start/end data 108 is transmitted from the graphical application 106 to an application service 110, deployed at a service provider network or computing network 112. The application service 110 is configured as a network service that provides data associated with the virtual space and placement of elements within the virtual space to the graphical application 106. According to one implementation, the application service 110 is a server application configured to provide placement and movement information for characters, enemies, and/or virtual representations of objects in the virtual space. Accordingly, the application service 110 provides information necessary for rendering portions of a graphical interface of the graphical application 106.

The application service 110 may receive the start/end data 108 and transmit the start/end data 108 to an artificial intelligence service 114. Generally, the artificial intelligence service 114 is deployed at the service provider network 112, and provides information related to a position of one or more elements in the virtual space to the application service 110. For example, the artificial intelligence service 114 is configured to manage the positioning and underlying decisions in positioning of the elements. Accordingly, in one configuration, the artificial intelligence service 114 manages enemies, characters, and other objects for a video game.

The artificial intelligence service 114 can also manage non-gaming related elements for some graphical applications. For example, the artificial intelligence service 114 may be configured to intelligently model possible obstacles in a flight-planning application, such as flocks of birds, jet streams, and other obstacles that may be encountered during the flight of an aircraft. The artificial intelligence service 114 may also be configured to model possible obstacles in a route-planning application, such as drawbridges, traffic patterns, and other obstacles that may be encountered during operation of a motor vehicle from an initial position to an end position. Still further, the artificial intelligence service 114 can be configured to model and manage the positioning of any object that can be represented in the virtual space. Accordingly, while specific examples have been provided above, these examples are non-limiting of every possible implementation of the technologies described herein.

The artificial intelligence service 114 may process the start/end data 108 and create associated element position data 116 and path/node data 118. For example the artificial intelligence service 114 may access a data store 126 that includes mapping information of the virtual space being considered. The data store 126 can include any suitable data storage device. Additionally, although illustrated as a centralized data store, the data store 126 can also include more than one data store, or potentially several data storage devices. Furthermore, the data store 126 may be represented as replicated data. The mapping information may be accessible any service deployed from the service provider network 112. Using the mapping information, the artificial intelligence service 114 may access, update, and store positioning information for elements in the virtual space. Additionally, path/cost data associated with the virtual space may also be stored through the data store 126. Accordingly, the artificial intelligence service 114 may create element position data 116 and path/cost data 118 representative of a current state of the virtual space.

The element position data 116 can include, for example, information related to other elements in the virtual space, an element currently being processed and the position of the element, and other data representative of positioning within the virtual space. The path/node data 118 can include, for example, information related to possible paths and intervening nodes for the element described in the element position data 116. Upon creation of the element position data 116 and the path/node data 118, the artificial intelligence service 114 may transmit the element position data 116 and the path/node data 118 to the pathfinding service 120 that is also deployed at the service provider network 112.

The pathfinding service 120 is configured to process the element position data 116 and the path/node data 118 to create path data 121 for distributed processing. For example, the pathfinding service 120 may determine if a valid path exists between the start/end data 108 as described in the path/node data 118. A valid path may be considered a path that can be fully traversed from an initial node to a goal or end node. The path data 121 may include more than one path, and one or more potential paths between the start/end data 108, in some circumstances.

The pathfinding service 120 directs individual paths described in the path data 121 to computing instances 122 having path cost tasks 124 executing thereon. For example, the pathfinding service 120 initializes a new computing instance 122 to process each possible path described in the path data 121. The possible paths generally include potential paths from the start node and end node described in the start/end data 108 provided through the graphical application 106.

The initialized computing instances 122 and associated path cost tasks 124 calculate an associated cost with traversing the path to reach the end node. The computing instances 122 may operate substantially in parallel. Furthermore, as each computing instance 122 and an associated path cost task 124 calculates cost data 128 associated with traversing an assigned path from the path data 121, the cost data 128 is transmitted to the pathfinding service 120 for consideration.

If an associated cost described in the cost data 128 in traversing to the end node is within an acceptable threshold, the remaining computing instances may be terminated and the processed path is returned as an acceptable solution to the geometry-based problem. For example, as the computing instances 122 operate substantially in parallel calculating costs associated with different paths, many different cost data 128 may be returned at different times. The pathfinding service 120 is configured to consider each associated cost data 128 as it is received. Upon receipt of cost data 128 with an acceptable total cost, the pathfinding service 120 transmits the cost and path information as a solution 129 to the artificial intelligence service 114.

Upon receipt of the solution 129, the artificial intelligence service 114, the application service 110, or the graphical application 106, may calculate new position data 130 representative of the associated element traversing the solution (in the form of the element moving through the virtual space) to the application service 110. Subsequently, the application service 110 can return the new position data 130 to the graphical application 106 for rendering on the customer computing system 104.

Although described as a single solution for the positioning of a single element within a virtual space, it should be understood that the system 100 is capable of determining multiple solutions for multiple elements in a distributed manner. Accordingly, the artificial intelligence service 114 can provide element position data 116 and path/node data 118 for multiple elements. Upon receipt, the pathfinding service 120 can process the data to determine multiple solutions 129 for the elements and associated positioning.

As described briefly above, the virtual space can be based on a grid-geometry. For example, a grid-geometry may be a simplified virtualization of an overhead view into a virtual space. Turning to FIG. 2A, a map diagram 200 illustrating aspects of a virtual space for processing by the pathfinding service 120 is illustrated, according to one configuration described herein.

As shown in FIG. 2A, the map diagram 200 includes start position 202 and a goal position 232. The start position 202 and the goal position 232 are separated by multiple possible paths represented as grid portions that are separated by obstacles 226. Additionally illustrated is a possible player element position 230. The grid portions include grid portions 204, 206, 210, 212, 214, 216, 218, 220, 222, and 224. For ease of description, each grid portion has also been labeled alphabetically.

Generally, the start position 202 and the goal position 232 represent the start/end data 108 provided by the graphical application 106. Additionally, the obstacles 226 may be stored as static or dynamic elements in the data store 126. Furthermore, player position 230 may also be stored through the data store 126. Accordingly, although illustrated as a static grid, it should be understood that the same may be varied throughout operation of the system 100 and execution of the graphical application 106.

Figure 2B:
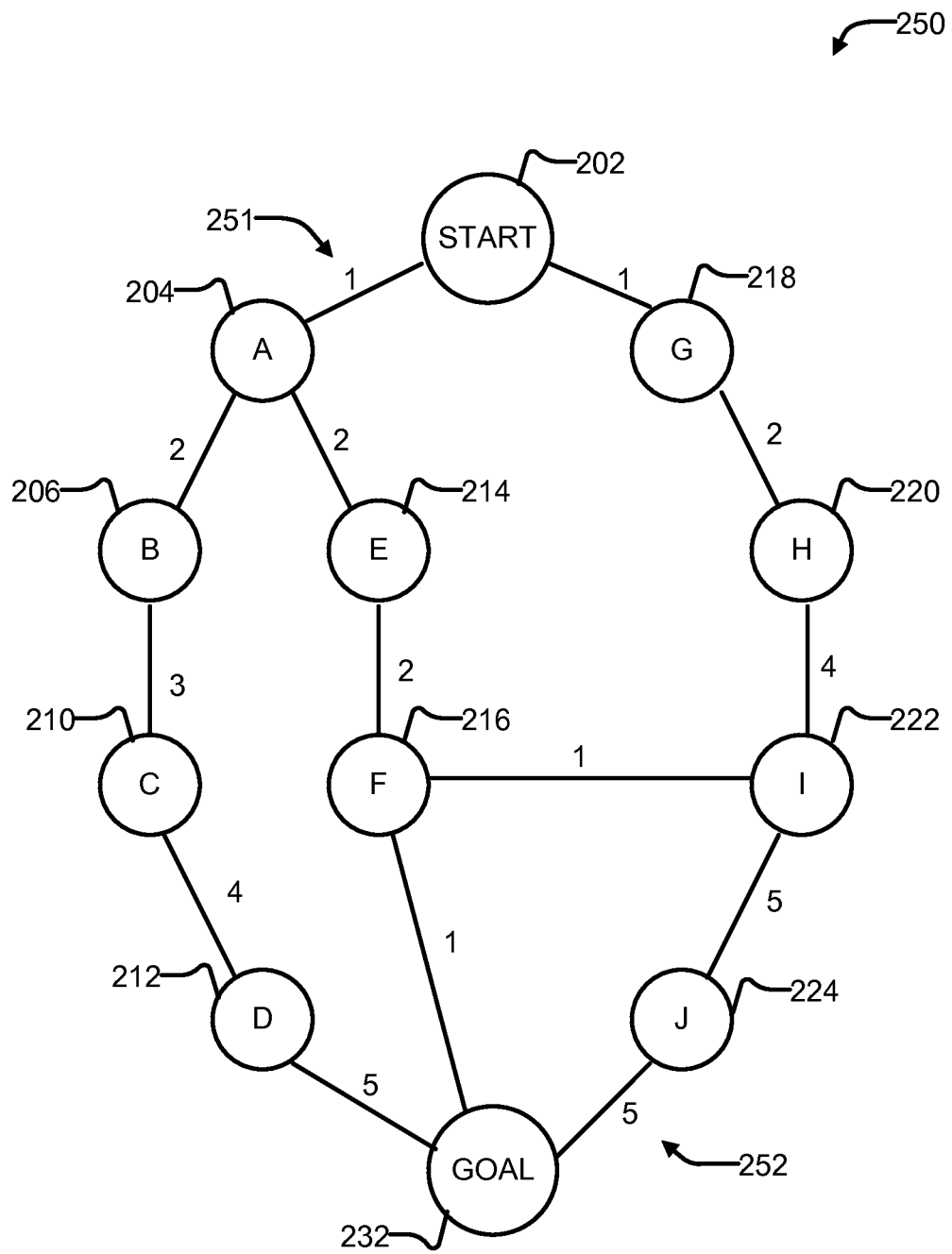
FIG. 2B is a path and node diagram illustrating aspects of a virtual space for processing by a pathfinding service in one configuration described herein.

The map diagram 200, including the associated start/end data 108, can be processed by the pathfinding service 120 to create path data 121 described above. FIG. 2B is a path and node diagram 250 illustrating aspects of the virtual space for processing by the pathfinding service 120, in one configuration described herein. As illustrated, the map diagram 200 can be represented by the path and node diagram 250. For example, the grid portions 204, 206, 210, 212, 214, 216, 218, 220, 222, and 224 are represented as individual nodes A, B, C, D, E, F, G, H, I, and J in the diagram 250. Furthermore, individual edges, such as edges 251 and 252, illustrate associated costs with traversing between adjacent nodes.

Upon processing by the pathfinding service 120, individual path data 121 is presented to a new computing instance 122. Following the diagram 250 as an example, upon processing start node 202, the pathfinding service 120 initializes two computing instances to consider the first path from node 202 to node 204 and the second path from node 202 to node 218. During processing of the first path, a third path is identified at node 204. Accordingly, the pathfinding service 120 initializes a new computing instance 122 to consider the third path from 204 to 214, while the first path continues to be processed at the same computing instance to determine cost associated with traversing between node 204 and node 206.

Similarly, during processing of the third path, a fourth path is presented at node 216 directed toward node 222. Furthermore, a fifth path is presented at node 222 directed towards node 216. In each of these circumstances, new computing instances 122 are initialized to consider the new paths.

During the processing of the paths in the distributed and substantially parallel manner described above, varying cost data 128 associated with the paths are calculated and returned to the pathfinding service 120. For example, in this particular diagram 250, a shortest distance, or optimal cost, of six is possible in the third path. Furthermore, a longest distance, or least optimal cost, of seventeen is possible in the second path. However, if the computing instance 122 processing the first path returns a total cost of fifteen as cost data 128 before completion of the processing of the second path or the third path, the pathfinding service 120 may return the first path as an acceptable solution, as described in more detail below.

The diagram 250 represents all possible paths of the virtual space represented by the diagram 200. During creation of the diagram 250, or a construct representing the diagram 250, the pathfinding service 120 may determine a threshold value for an acceptable solution based on many factors. The threshold may be a scalar distance or cost based on pre-configured considerations stored at the data store 126, or provided by the graphical application 106. The scalar distance or cost may also be a user-defined cost or percentage of a cost, associated with an expected maximum path cost for any virtual space. Additionally, if prior knowledge of the shortest possible path is stored at the data store 126 or provided by the graphical application 106, a multiple of the shortest possible path may be determined to be an acceptable threshold.

In the example presented whereby the first path with a cost of fifteen is accepted, a threshold of greater than fifteen has been considered acceptable. It is noted that many possible threshold values may be acceptable under many different implementations. Accordingly, other thresholds and manners of determining the same are within the scope of this disclosure.

In addition to the path calculations described above, it is noted that other forms of path data 121 may be used to determine an acceptable solution. For example, according to one implementation, a hashing algorithm can be used to hash the diagram 250 into one or more equations, such as linear equations, for processing in a distributed manner. The hashing algorithm can include any suitable algorithm configured to produce a equation that represents a valid path.

Continuing the example presented above, the diagram 250 can be represented by at least three equations. These example linear equations are presented, below:

$$Cost_{First} = ACost_{StartA} + BCost_{AB} + CCost_{BC} + DCost_{CD} + Cost_{DGoal} \quad \text{Equation 1:}$$

$$Cost_{Second} = GCost_{StartG} + HCost_{GH} + ICost_{HI} + JCost_{IJ} + Cost_{JGoal} \quad \text{Equation 2:}$$

$$Cost_{Third} = ACost_{StartA} + ECost_{AE} + FCost_{EF} + Cost_{FGoal} \quad \text{Equation 3:}$$

As shown, the first path is represented by Equation 1, the second path by Equation 2, and the third path by Equation 3. Additional equations representing additional paths are also possible. However, for the sake of clarity, the three paths described above are also described here.

Upon creating the equations, the pathfinding service 120 may provide the same to individual computing instances 122 for processing and solving. As each equation is solved, associated cost data 128, represented as $Cost_{First}$, $Cost_{Second}$, and $Cost_{Third}$, is returned to the pathfinding service 120. If $Cost_{First}$ is returned initially, as a value of fifteen, the pathfinding service 120 may determine that as fifteen is less than the threshold of greater than fifteen, the first path is an acceptable solution. Alternatively, if $Cost_{Third}$ is returned initially, the pathfinding service 120 may determine that as six is less that the threshold value of greater than fifteen, the third path is an acceptable solution, which also is an optimal solution. Furthermore, upon determining an acceptable solution, any remaining computing instances 122 that were initialized for solving an associated equation may be terminated.

As described above, the pathfinding service 120 may determine acceptable solutions to geometry-based problems efficiently through distributed computing of computing instances 122. Hereinafter, the operation of the system 100 and components described therein is presented with reference to FIGS. 3-4.

Figure 3:
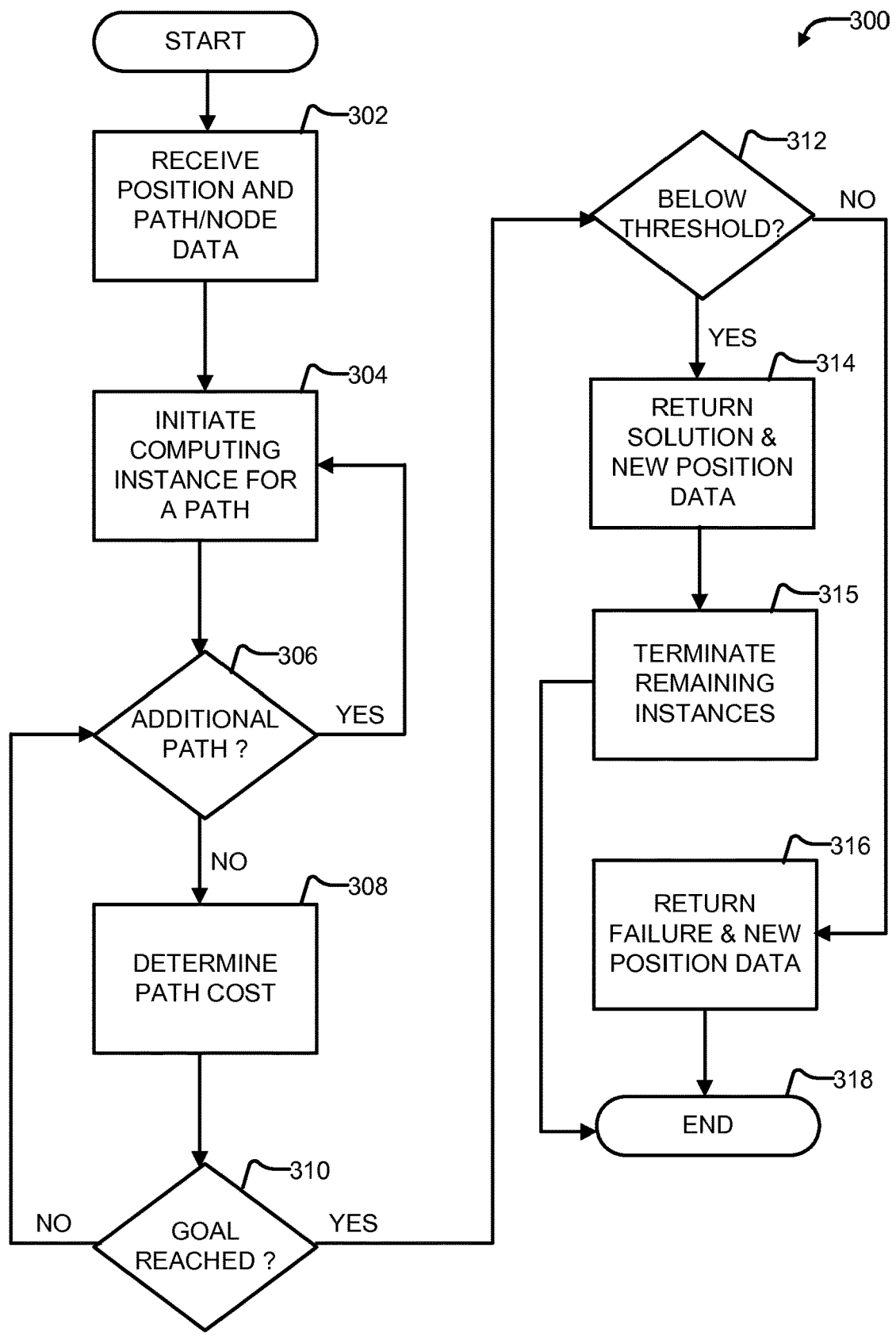
FIG. 3 is a flow diagram illustrating aspects of the operation of a pathfinding service in one configuration disclosed herein.

FIG. 3 is a flow diagram of a method 300 illustrating aspects of the operation of the pathfinding service 120 in one configuration disclosed herein. As shown in FIG. 3, the pathfinding service 120 receives element position data 116 and path/node data 118, at block 302. The pathfinding service 120 may process the element position data 116 and path/node data 118 to determine one or more possible paths, and initiate a computing instance 122 for a path at block 304.

Upon initiating the computing instance 122, the pathfinding service 120 may determine if an additional path exists at block 306. If an additional path exists, the pathfinding service 120 may continually initiate new computing instances 122 for each additional paths as illustrated in blocks 304 and 306.

Subsequent to initiating computing instances 122, or at substantially the same time, a computing instance 122 may determine a cost associated with a processed path, which is returned as cost data 128, at block 308. If an end node has been reached, and therefore the associated goal node (e.g., 232), the pathfinding service 120 may determine if the returned cost data 128 is below the pre-determined or desired threshold, at block 312. If the cost data 128 is below the threshold, the pathfinding service 120 may return the solution 129 and the artificial intelligence service 114 may determine new position data, at block 314. Thereafter, additional computing instances 122 may be terminated at block 315 by the pathfinding service 120.

Alternatively, if no additional paths remain to be processed, and no cost data 128 is below the threshold, the pathfinding service 120 may return a failure signal, and the artificial intelligence service 114 may determine new position data 130 based on the failure. For example, the artificial intelligence service 114 may utilize the last processed path, the least costly path of all sub-optimal paths, or other data in determining arbitrary new position data 130. Upon returning an acceptable solution or failure, the method 300 may cease at block 318.

As described above, the pathfinding service 120 may distribute path data 121 to newly initialized computing instances 122 and determine if an acceptable solution 129 to a geometry-based problem exists. Furthermore, as described above, the pathfinding service 120 may distribute other forms of data, such as equations, to newly initialized computing instances.

Figure 4:
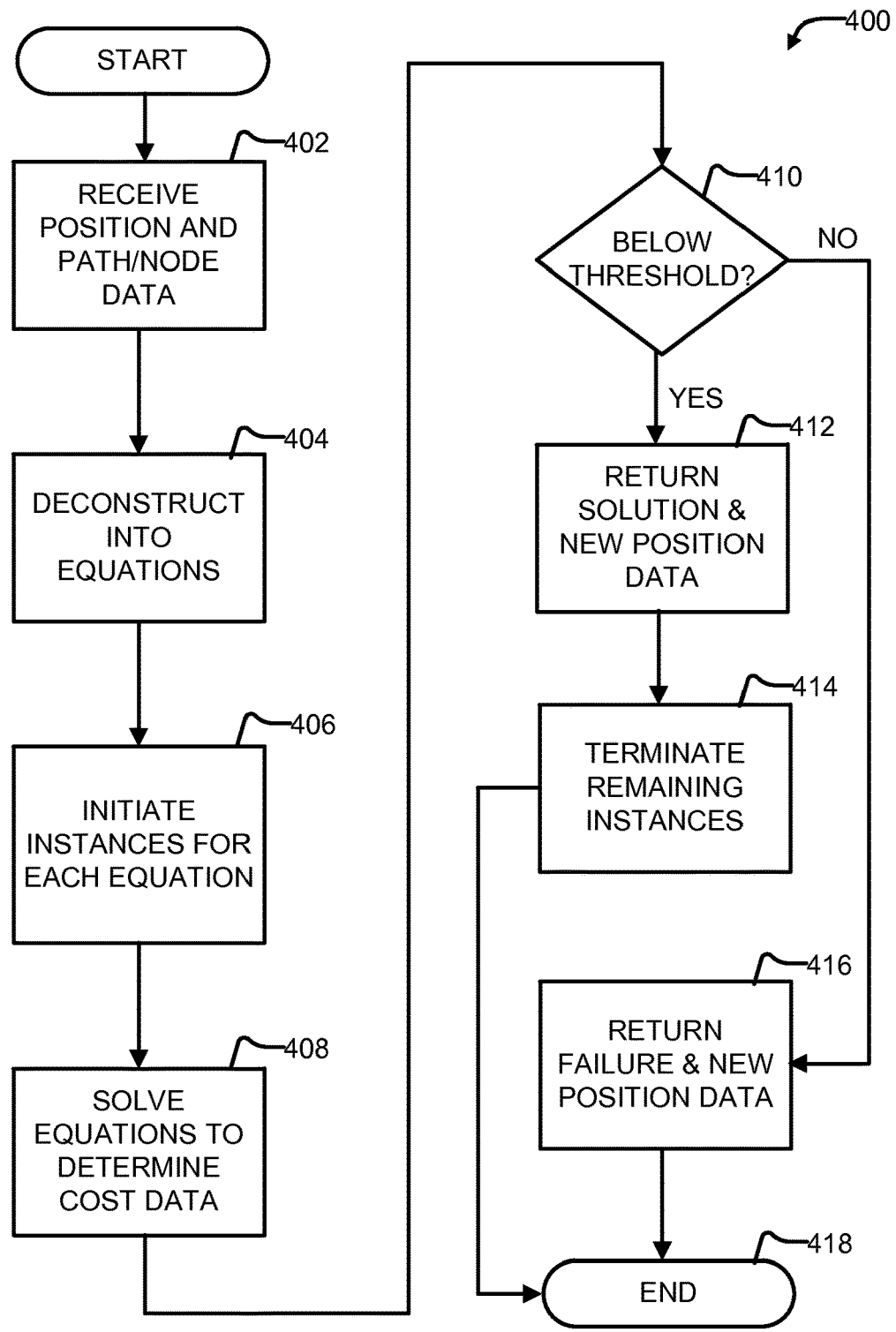
FIG. 4 is a flow diagram illustrating aspects of the operation of a pathfinding service in one configuration disclosed herein.

FIG. 4 is a flow diagram of a method 400 illustrating aspects of the operation of the pathfinding service 120 in one configuration disclosed herein. As shown in FIG. 4, the pathfinding service 120 receives element position data 116 and path/node data 118, at block 402. The pathfinding service 120 may process the element position data 116 and path/node data 118, and deconstruct the path/node data 118 into one or more equations at block 404. For example, the equations may be arranged similar to Equation 1, Equation 2, and Equation 3, described above. Thereafter, the pathfinding service 120 may initiate a new computing instance 122 to for each equation at block 406.

Subsequent to initiating computing instances 122, or at substantially the same time, a computing instance 122 may determine a cost associated with an equation, which is returned as cost data 128, at block 408. If the cost data 128 is below the threshold, the pathfinding service 120 may return the solution 129 based on the path represented by the solved equation, and the artificial intelligence service 114 may determine new position data, at block 412. Thereafter, additional computing instances 122 may be terminated at block 414 by the pathfinding service 120.

Alternatively, if no cost data 128 is below the threshold, the pathfinding service 120 may return a failure signal, and the artificial intelligence service 114 may determine new position data 130 based on the failure at block 416. For example, the artificial intelligence service 114 may utilize the last processed equation, the least costly path of all sub-optimal paths associated with the equations, or other data in determining arbitrary new position data 130. Upon returning an acceptable solution or failure, the method 400 may cease at block 418.

As described above, a pathfinding service, illustrated as service 120, can be implemented that provides functionality for processing geometry-based problems in a distributed manner to generate acceptable solutions to positioning elements in a virtual space. Additionally, the pathfinding service 120 can provide functionality for heirachical processing of geometry-based problems, as described in detail below with reference to FIGS. 2A and 5-6.

Figure 5:
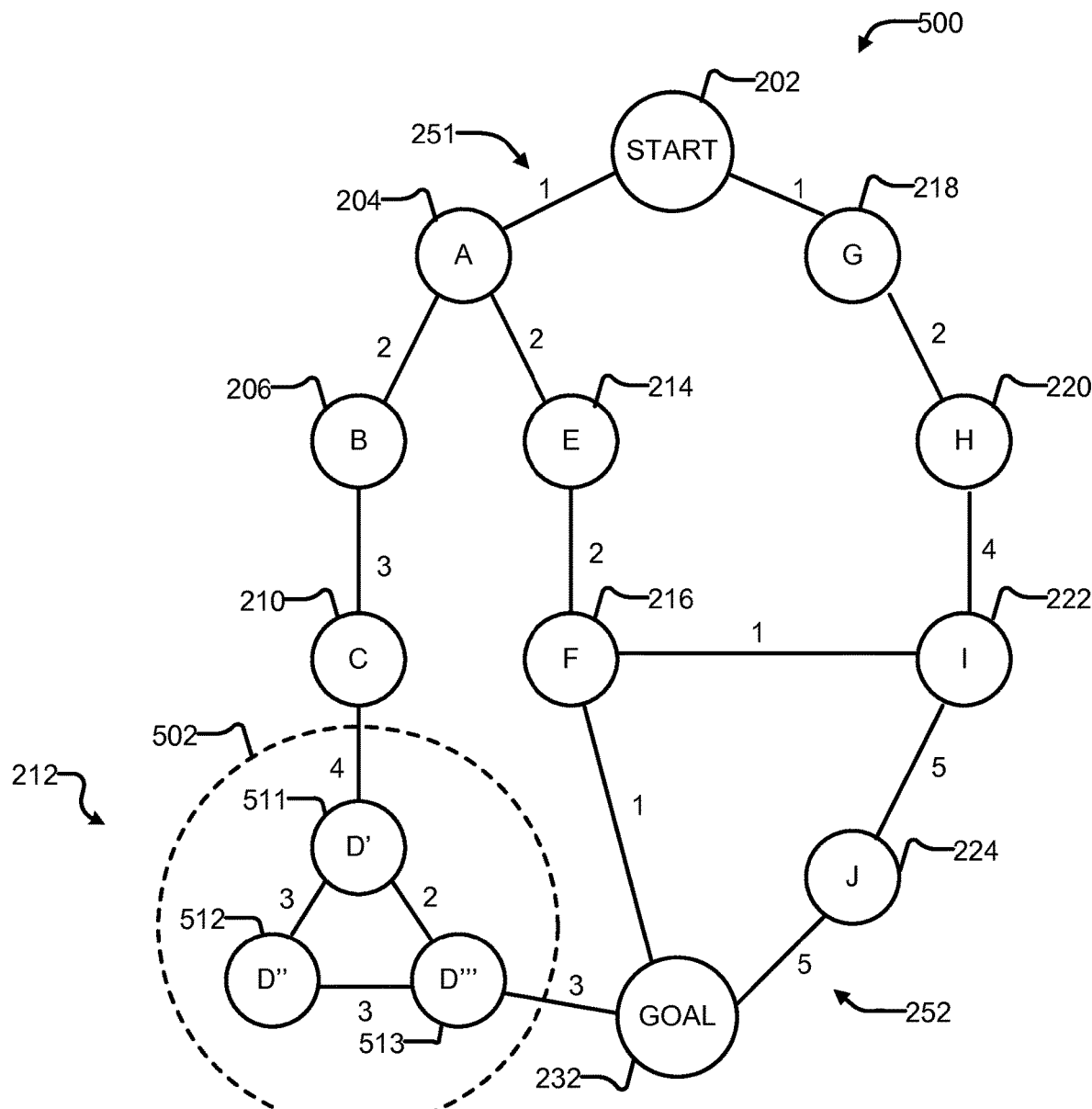
FIG. 5 is a path and node diagram illustrating aspects of a virtual space for processing by a pathfinding service in one configuration disclosed herein.

As described above with reference to FIG. 2A, the map diagram 200, including the associated start/end data 108, can be processed by the pathfinding service 120 to create path data 121 described above. FIG. 5 is a path and node diagram 500 illustrating aspects of the virtual space for processing by the pathfinding service 120, in one configuration described herein.

As illustrated, the map diagram 200 can be represented by the path and node diagram 500. For example, the grid portions 204, 206, 210, 214, 216, 218, 220, 222, and 224 are represented as individual nodes A, B, C, E, F, G, H, I, and J in the diagram 500. Furthermore, individual edges, such as edges 251 and 252, illustrate associated costs with traversing between adjacent nodes. However, there may exist many finer levels of granularity in any grid portion. Thus, each of the grid portions can be divided into many smaller grid portions having an initial position and an end position for traversal through the overlying grid portion. For example, the grid portion D 212 may be divided into three sub-portions D' 511, D" 512, and D'" 513. Each sub-portion D', D", and D'" may have a cost associated therewith for traversal.

As further shown in FIG. 5, the grid portion 212 has been represented by a hierarchical representation 502 of the underlying paths and sub-portions. The hierarchical representation 502 may also include an acceptable solution for a shortest path existing therein. In this example, sub-portions D' 511, D" 512, and D'" 513 may have an acceptable path between nodes C and Goal. This particular path may be determined by the pathfinding service 120 to include traversal between node C, node D', node D'", and node Goal. Thus, the diagram 500 may be simplified to the diagram 250 shown in FIG. 2B as described below.

Upon processing by the pathfinding service 120, individual path data 121 is presented to a new computing instance 122. Following the diagram 500 as an example, upon processing node 210 and node 511, the pathfinding service 120 initializes computing instances to consider the path from node 511 to node 512 and the alternate path from node 511 to node 513. The computing instances may perform an A* search to determine a solution from the paths, for example.

During the processing of the paths, varying cost data 128 associated with the paths are calculated and returned to the pathfinding service 120. For example, in this particular diagram 500, a shortest distance, or optimal cost, of four is possible for traversal between nodes 210 and 232. Thus, the pathfinding service 120 may cache the hierarchical representation 502 as the node 212 of FIG. 2B, having a cost of four associated with reaching the node 232. The cache of the hierarchical representation 502 may also include other information related to the underlying grid portions shown as D', D", and D"', in some implementations.

The caching of the hierarchical representation 502 may be facilitated through the data store 126, in one configuration. Furthermore, the caching of the hierarchical representation 502 may be facilitated through other storage devices. Additionally, individual path calculations for an acceptable solution to a particular hierarchical representation may be distributed in the manner described above with reference to FIGS. 3 and 4, or may be performed by an individual computing system or a computing instance 122. In this manner, previously calculated path solutions that can be generalized as a grouping of paths with a single solution can be cached as a hierarchical representation, such as 502.

Other information related to the hierarchical representation 502 and the underlying sub-portions D', D", and D"' may also be cached. According to at least one configuration, the current state of all elements existing within the virtual space in any of sub-portions D', D", and D"' are cached with the hierarchical representation 502. Additionally, the start position of D' and the end position of D"' may also be cached with the hierarchical representation 502. The acceptable solution to traversal and an associated cost of traversal may also be cached with the hierarchical representation 502. Furthermore, any additional information related to any of the sub-portions D', D", and D"' may also be cached with the hierarchical representation 502.

However, if any individual cost associated with the hierarchical representation 502 is determined to have changed, the cost associated with the representation 502 may be invalidated, recomputed, or otherwise updated to reflect the change. For example, if a dynamic element is introduced that alters a cost associated with traversing node 210, node 511, and node 513, the pathfinding service 120 may flag the hierarchical representation 502 as invalid for new path calculations. Thereafter, upon presentation of the node 210, the pathfinding service 120 may attempt to recalculate an acceptable solution, and subsequently re-cache the results for future use as an updated hierarchical representation 502. Other forms of invalidation events are also possible. For example, an invalidation event can include a time out for invalidating caches having a threshold age. An invalidation event can also include the introduction of one or more new elements into an underlying grid portion represented by 502, for example in a video game. Invalidation events can also include any suitable invalidation trigger for any underlying sub-portion represented by hierarchical representation 502.

Although the above example has been greatly simplified, it should be understood that multiple nodes may be cached as hierarchical representations of underlying sub-nodes and paths. For example, according to FIG. 5, any of nodes 204, 206, 210, 214, 216, 218, 220, 222, and 224 may include sub-portions representative of the grid 200. Furthermore, each of these sub-portions may include a solution that can be cached for use in future path calculations. Additionally, multiple hierarchical representations such as 502 can be grouped together in higher-level hierarchical representations of the multiple underlying hierarchies. These differing levels of granularity may be updated according to changes in the underlying weights, or other changes to the grid 200.

Figure 6A:
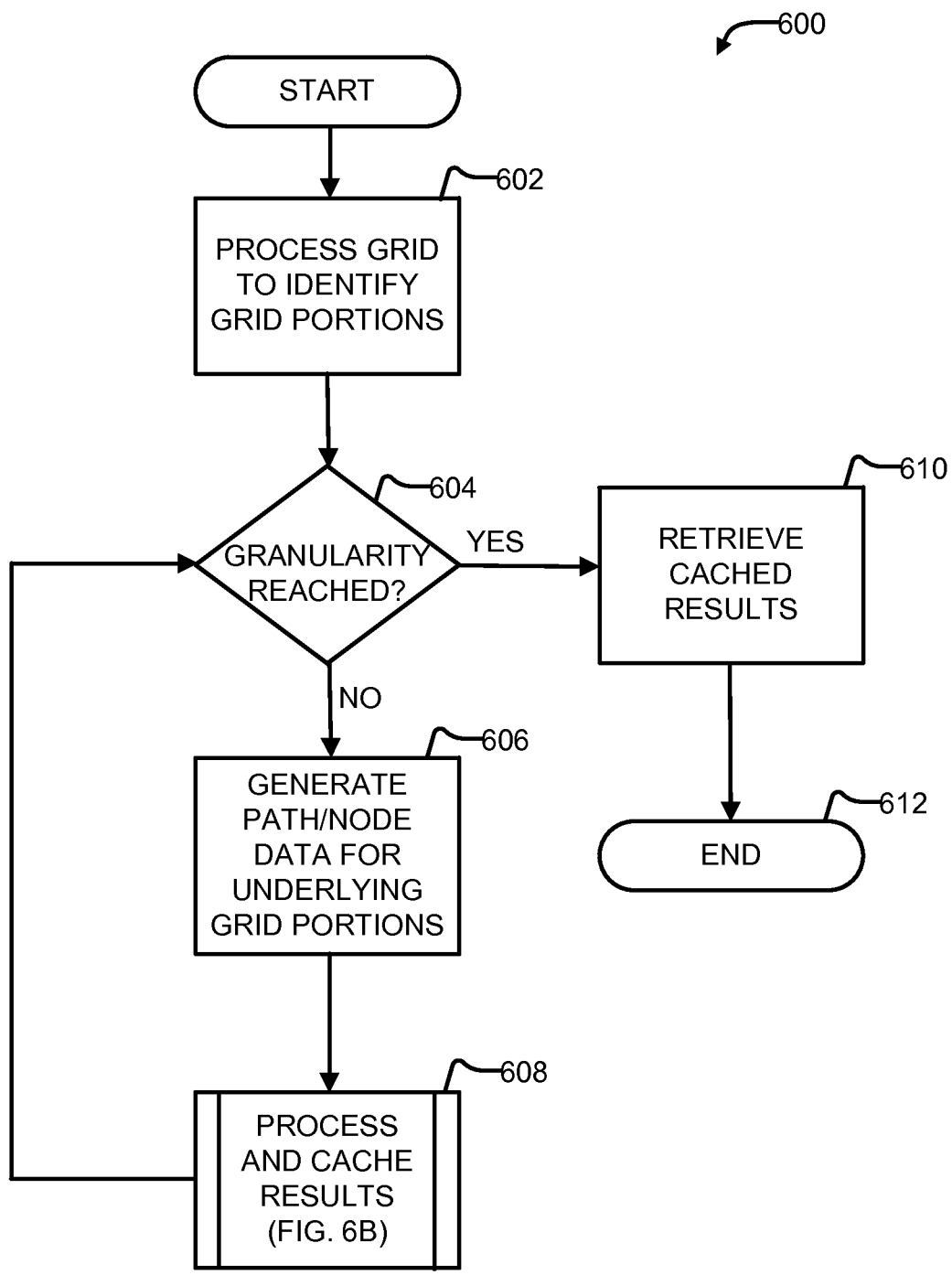
FIG. 6A is a flow diagram illustrating aspects of the operation of a pathfinding service in one configuration disclosed herein.

FIG. 6A is a flow diagram of a method 600 illustrating aspects of the operation of the pathfinding service 120 in one configuration disclosed herein. As illustrated in FIG. 6A, the pathfinding service 120 may process a grid, such as grid 200, to identify grid portions of the grid, at block 602. Generally, the processing of the grid can include processing pre-processed grid portions identifying a specific level of granularity associated with hierarchical representations. The pre-processed grid portions may be pre-processed prior to run-time by a network service or graphical application. The granularity may be defined according to a particular threshold, total number of acceptable hierarchical representations, or other attributes. Additionally, the processing of the grid can include pre-defined or desired hierarchical representations for a particular grid, in some implementations.

Upon processing, the pathfinding service 120 may determine that a particular level of granularity has been reached, at block 604. The level of granularity can be pre-defined as described above, or based on any suitable threshold. If the level for granularity has not been reached, the pathfinding service 120 generates path/node data for underlying grid portions of a hierarchical representation at block 606.

The pathfinding service further processes and caches results for the hierarchical representation at that level of granularity at block 608, which is further described below with reference to FIG. 6B. Upon caching the hierarchical representation, the pathfinding service 120 may recursively cache and/or update hierarchical representations until a desired level of granularity is reached as illustrated through blocks 604, 606, and 608. Thereafter, the pathfinding service 120 may retrieve cached results for the desired level of granularity at block 610, and the method 600 may cease at block 612.

Figure 6B:
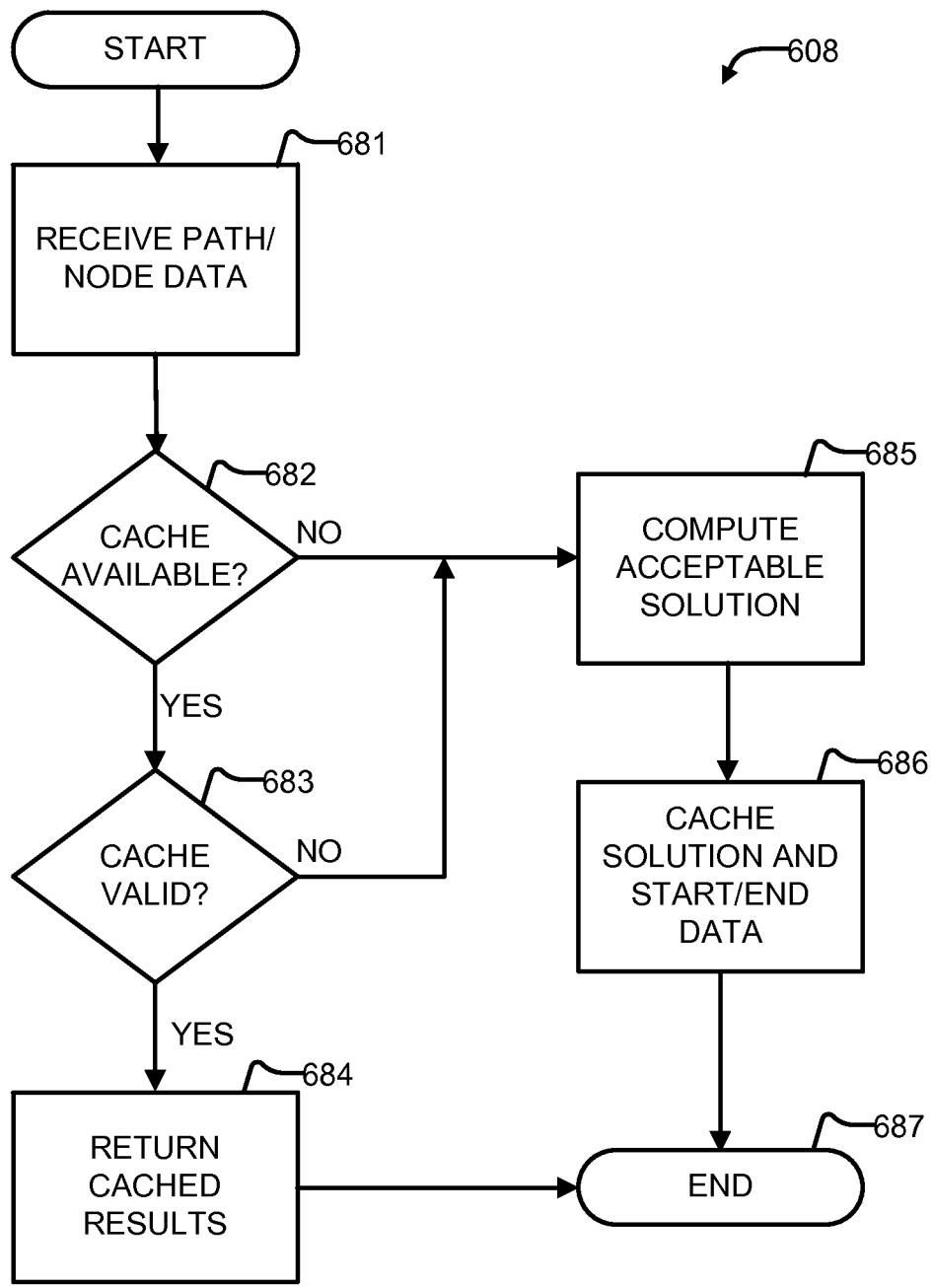
FIG. 6B is a flow diagram illustrated aspects of the operation of a pathfinding service in one configuration disclosed herein.

FIG. 6B is a flow diagram of the method 608 illustrating aspects of the operation of the pathfinding service 120 in one configuration disclosed herein. As shown in FIG. 6B, the pathfinding service 120 may receive path and node data at block 681. For example, the path and node data may include indication that one or more hierarchical representations 502 exist along a path, and the pathfinding service may determine at block 682 if a cached result exists.

The pathfinding service 120 may further determine if the hierarchical representation 502 and associated cached result is valid at block 683. If the cached result is valid, the pathfinding service 120 may return the cached result as a solution to traversal between a start node and an end node for the hierarchical representation 502, at block 684.

Alternatively, if the cached result is invalid, or if there are no cached results, the pathfinding service 120 may attempt to compute an acceptable solution for the hierarchical representation 502 at block 685. For example, computing an acceptable solution may include any process for determining a path solution to the underlying portions of representation 502. Upon receipt of the acceptable solution, the pathfinding service 120 may cache the solution and associated start end data at block 686, for use at block 684, and the method 600 may cease at block 687.

Generally, the pathfinding service 120 may be configured to continually update cached results as described above, for example, in response to new requests for path solutions or in response to any changes to an underlying sub-portion of a previously cached hierarchical representation. The pathfinding service 120 may also continually divide the grid into increasingly smaller portions or finer granularity in the recursive manner described above. Furthermore, the pathfinding service may use previously cached results with any suitable pathfinding algorithm, such as an A* search algorithm, for example, by implementing the hierarchical representation 502 as the node 212 in pathfinding calculations.

As described above, the pathfinding service 120 can provide functionality for processing geometry-based problems in a distributed manner to generate acceptable solutions to positioning elements in a virtual space. Additionally, the pathfinding service 120 can provide functionality for heirachical processing of geometry-based problems and caching of results. Alternative implementations of the particular examples described above are also possible, and are within the scope of this disclosure. Furthermore, different operating environments and computing devices may be used to implement some or all of the functionality described herein. Hereinafter, non-limiting examples of possible operating environments and computing devices are described more fully with reference to FIGS. 7-9.

Figure 7:
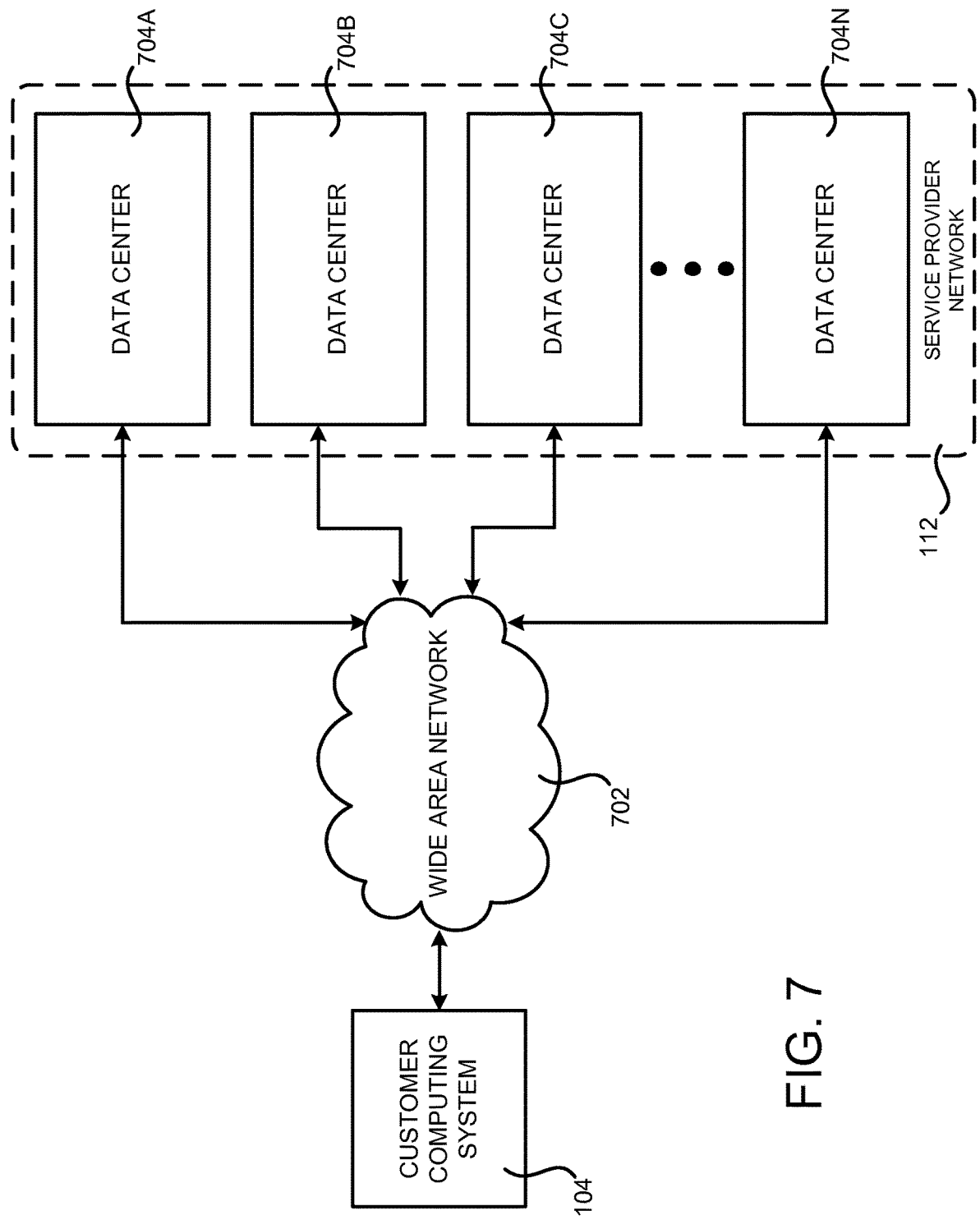
FIG. 7 is a system and network diagram that shows an illustrative operating environment for the various technologies disclosed herein that includes a service provider network that may be configured to implement aspects of the functionality described herein.

FIG. 7 is a system and network diagram that shows one illustrative operating environment for the configurations disclosed herein that includes a service provider network 112 that may be configured to provide a pathfinding service 120 in the manner described above, according to one configuration disclosed herein. As discussed briefly above, the service provider network 112 can provide computing resources that may be instantiated through the pathfinding service 120, on a permanent or an as-needed basis.

The computing resources provided by the service provider network 112 may include various types of computing resources, such as data processing resources, data storage resources, networking resources, data communication resources, and the like. Each type of computing resource may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, and other types of applications. Data storage resources may include file storage devices, block storage devices, and the like. As discussed briefly above, the service provider network 112 might also be configured to provide various network services including the application service 110.

The computing resources provided by the service provider network 112 are enabled in one implementation by one or more data centers 704A-704N (which may be referred herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 might also be located in geographically disparate locations. One illustrative configuration for a data center 704 that implements some of the technologies disclosed herein for integrating a pathfinding service 120 within the service provider network 112 will be described below with regard to FIG. 8.

The customers and other users of the service provider network 112 may access the computing resources provided by the service provider network 112 over a network 702, such as a wide area network (WAN). For example, and without limitation, a customer computing system 104 might be utilized to access the service provider network 112 by way of the network 702. It should be appreciated that a local-area network (LAN), the Internet, or any other networking topology known in the art that connects the data centers 704 to remote customers and other users may be utilized. It should also be appreciated that combinations of such networks might also be utilized.

Figure 8:
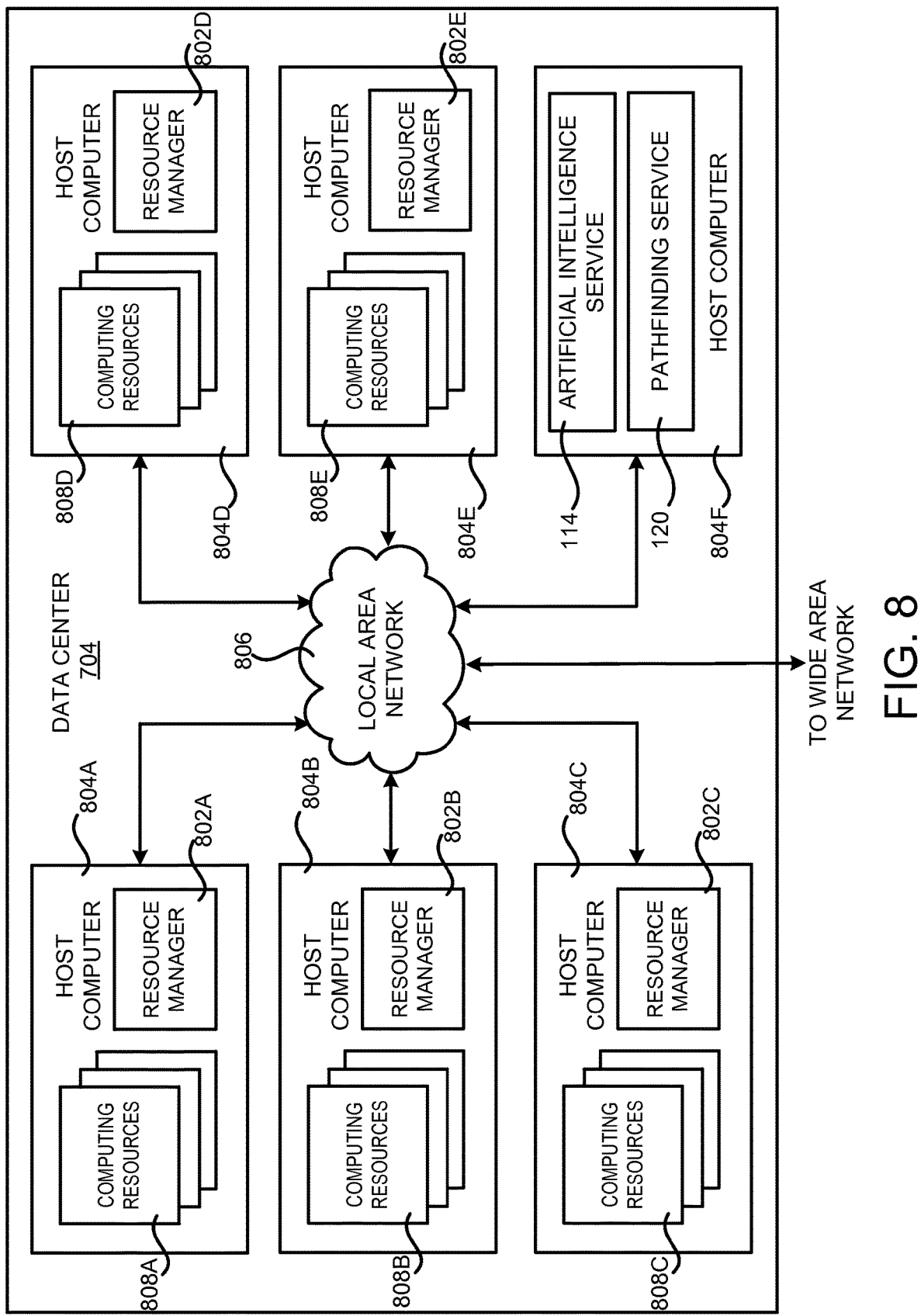
FIG. 8 is a computing system diagram that illustrates a configuration for a data center that may be utilized to implement aspects of the concepts and technologies disclosed herein.

FIG. 8 is a computing system diagram that illustrates one configuration for a data center 704 that implements aspects of the concepts and technologies disclosed herein for implementing a pathfinding service 120, artificial intelligence service 114, and other services, according to one configuration disclosed herein. The example data center 804 shown in FIG. 8 includes several server computers 802A-802F (which may be referred to herein singularly as "a server computer 802" or in the plural as "the server computers 802") for providing computing resources 808A-808E.

The server computers 802 may be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 802 might also be configured to execute a resource manager 804 capable of instantiating and/or managing the computing resources based on path/node data 118 provided for processing by the pathfinding service 120. In the case of virtual machine instances, for example, the resource manager 804 might be a hypervisor or another type of program configured to enable the execution of multiple virtual machine instances on a single server 802 to implement the path cost tasks 124, for example. Server computers 802 in the data center 704 might also be configured to provide network services and other types of services, as well.

The data center 704 shown in FIG. 8 also includes a server computer 802F that may be utilized for executing some or all of the software components described above. For example, and without limitation, the server computer 802F might be configured to execute the pathfinding service 120 and the artificial intelligence service 114, which has been described in detail above. The server computer 802F might also be configured to execute other components and/or store data for providing some or all of the functionality described herein.

In the example data center 704 shown in FIG. 8, an appropriate LAN 806 is utilized to interconnect the server computers 802A-802F. The LAN 806 is also connected to the network 702 illustrated in FIG. 7. It should be appreciated that the configuration and network topology illustrated in FIGS. 1 and 7-8 has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 704A-704N, between each of the server computers 802A-802F in each data center 704, and, potentially, between computing resources in each of the data centers 704. It should be appreciated that the configuration of the data center 704 described with respect to FIG. 8 is merely illustrative and that other implementations might be utilized.

Figure 9:
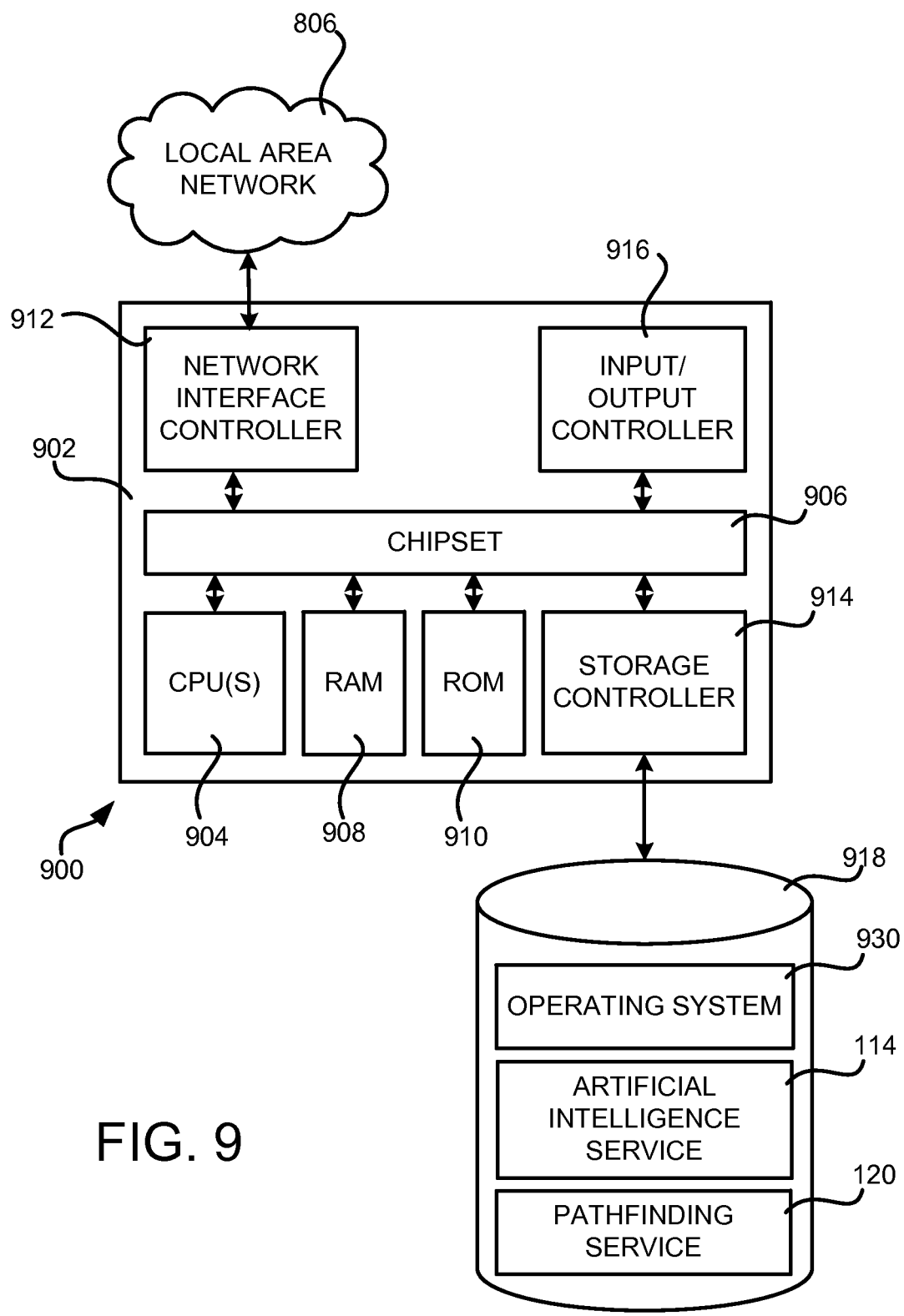
FIG. 9 is a computer architecture diagram showing an illustrative computer hardware architecture for implementing a computing device that might be utilized to implement aspects of the various technologies presented herein.

FIG. 9 shows an example computer architecture for a computer 900 capable of executing program components for implementing the pathfinding service 120 in the manner described above. The computer architecture shown in FIG. 9 illustrates a conventional server computer, workstation, desktop computer, laptop, tablet, network appliance, e-reader, smartphone, or other computing device, and may be utilized to execute any of the software components presented herein. For example, the computer architecture shown in FIG. 9 may be utilized to execute software components for providing the pathfinding service 120 and/or related functionality. The computer architecture shown in FIG. 9 might also be utilized to implement a customer computing system 104 or any other of the computing systems described herein.

The computer 900 includes a baseboard 902, or "motherboard," which is a printed circuit board to which a multitude of components or devices may be connected by way of a system bus or other electrical communication paths. In one illustrative configuration, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory (ROM) 910 or non-volatile RAM (NVRAM) for storing basic routines that help to startup the computer 900 and to transfer information between the various components and devices. The ROM 910 or NVRAM may also store other software components necessary for the operation of the computer 900 in accordance with the configurations described herein.

The computer 900 may operate in a networked environment using logical connections to remote computing devices and computer systems through a network, such as the local area network 906. The chipset 906 may include functionality for providing network connectivity through a NIC 912, such as a gigabit Ethernet adapter. The NIC 912 is capable of connecting the computer 900 to other computing devices over the network 806. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules, and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 918 may store other system or application programs and data utilized by the computer 900, such as the pathfinding service 120, and/or any of the other software components and data described above. The mass storage device 918 might also store other programs and data not specifically identified herein.

In one configuration, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various routines described above with regard to FIGS. 3-4 and 6. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for providing a pathfinding service, and for distributed processing to determine acceptable solutions to geometry-based problems, have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method comprising:
   initiating a first computing instance to process first information associated with a first path in a game environment;
   initiating a second computing instance to process second information associated with a second path in the game environment;
   determining a first cost associated with traversing the first path;
   determining a second cost associated with traversing the second path;
   determining a third cost associated with an intermediate position geometrically located between a start node and an end node that are associated with the first path or the second path;
   selecting an acceptable route based at least in part on one of the first cost or the second cost, and based at least in part on the third cost;
   terminating one of the first computing instance or the second computing instance based at least in part on selecting the acceptable route;
   determining start data representing a start position of the acceptable path and end data representing an end position of the acceptable path; and
   generating position data for a graphical element in the game environment based at least in part on the acceptable path, the start data, and the end data.

2. The computer-implemented method of claim 1, further comprising:
   receiving the first cost associated with traversing the first path;
   determining that the first cost is below a threshold; and
   selecting the first path as the acceptable route.

3. The computer-implemented method of claim 1, wherein the first path and the second path are between the start node and the end node within the game environment, and the computer-implemented method further comprises:
   identifying a third path being a potential path between the start node and the end node;
   initiating a third computing instance to process information associated with the third path;
   determining a third cost associated with traversing the third path; and
   selecting the acceptable route based at least in part on one of the first cost, the second cost, and the third cost.

4. The computer-implemented method of claim 3, further comprising:
   receiving the first cost associated with traversing the first path;
   determining that the first cost is equal to or over a threshold; and
   terminating the first computing instance responsive to determining that the first cost is equal to or over the threshold.

5. The computer-implemented method of claim 3, further comprising:
   receiving the first cost associated with traversing the first path;
   determining that the first cost is below a threshold;
   selecting the first path as the acceptable route; and
   terminating the second computing instance and the third computing instance responsive to selecting the first path.

6. A computing network comprising:
   one or more computing systems having a pathfinding service deployed thereon, the pathfinding service configured to:
   initiate a plurality of computing instances to process information associated with a plurality of paths through a game environment;
   determine a first cost associated with traversing the plurality of paths;
   determine a second cost associated with an intermediate position geometrically located between a start node and an end node associated with the plurality of paths;
   select an acceptable path based, at least in part, on the first cost and the second cost;
   terminate at least one of the plurality of computing instances based at least in part on selecting the acceptable path;
   determine start data representing a start position of the acceptable path and end data representing an end position of the acceptable path; and
   generate position data for a graphical element in the game environment based at least in part on the acceptable path, the start data, and the end data.

7. The computing network of claim 6, wherein the pathfinding service is further configured to:
   determine that the first cost or the second cost is below a threshold, wherein selecting the acceptable path is based at least in part on determining that the first cost or the second cost is below the threshold.

8. The computing network of claim 6, wherein the pathfinding service is further configured to terminate remaining computing instances of the plurality of computing instances in response to selecting the acceptable path.

9. The computing network of claim 6, wherein the plurality of computing instances process the information associated with the plurality of paths substantially in parallel.

10. The computing network of claim 6, further comprising an application deployed on the one or more computing systems, the application configured to render a graphical element traversing the acceptable path.

11. The computing network of claim 6, wherein at least one of the one or more computing systems has an application service deployed thereon that is configured to receive the start data and the end data from a graphical application.

12. The computing network of claim 11, wherein the plurality of paths are valid paths for traversing the game environment between the start position and the end position.

13. A computer-implemented method to determine a path, the method comprising:
    generating a plurality of linear equations representative of a plurality of paths in a game environment;
    initiating a plurality of computing instances to process the plurality of linear equations;
    determining a first cost associated with traversing the plurality of paths by solving the plurality of linear equations;
    determining a second cost associated with an intermediate position located between a start node and an end node of the plurality of paths;
    selecting an acceptable path of the plurality of paths based at least in part on the first cost and the second cost;
    terminating one of the plurality of computing instances based at least in part on selecting the acceptable path;
    determining start data representing a start position of the acceptable path and end data representing an end position of the acceptable path; and
    generating position data for a graphical element in the game environment based at least in part on the acceptable path, the start data, and the end data.

14. The computer-implemented method of claim 13, further comprising:
    determining that the first cost or the second cost is below a threshold; and
    outputting a path associated with the first cost or the second cost.

15. The computer-implemented method of claim 13, further comprising terminating remaining computing instances of the plurality of computing instances in response to selecting the acceptable path.

16. The computer-implemented method of claim 13, wherein receiving the start data and the end data further comprising receiving the start data and the end data from a graphical application.

17. The computer-implemented method of claim 16, wherein the plurality of paths are valid paths for traversing the game environment between the start position and the end position.

18. The computer-implemented method of claim 13, wherein generating the plurality of linear equations comprises:
    hashing nodes of the plurality of paths through a hashing algorithm to determine a set of constants and additional costs associated with edges of the plurality of paths; and
    assembling an equation from the set of constants and the additional costs.

19. The computer-implemented method of claim 13, further comprising caching the acceptable path and an associated cost of the costs associated with traversing the plurality of paths for use in future calculations to determine additional acceptable paths.

20. The computer-implemented method of claim 18, wherein the additional costs comprise at least:
    a third cost associated with at least the start position in the game environment; and
    a fourth cost associated with at least the end position in the game environment.

* * * * *